United States Patent [19]

Fabris

[11] Patent Number: 4,738,023
[45] Date of Patent: Apr. 19, 1988

[54] HOOKING APPARATUS FOR A REMOVABLE CONSTRICTION PLUG

[75] Inventor: Mirko Fabris, Nivelles, Belgium

[73] Assignee: Ateliers de Constructions Electriques de Charleroi (ACEC) Societe Anonyme, Brussels, Belgium

[21] Appl. No.: 63,797

[22] Filed: Jun. 22, 1987

Related U.S. Application Data

[63] Continuation of Ser. No. 746,262, Jun. 19, 1985, abandoned.

[30] Foreign Application Priority Data

Jun. 20, 1984 [EP] European Pat. Off. .......... 84870081

[51] Int. Cl.$^4$ .............................................. B23P 19/00
[52] U.S. Cl. ................................. 29/723; 29/400 N; 376/353; 376/463; 414/146
[58] Field of Search .................... 29/278, 280, 400 N, 29/723; 376/260, 460, 463; 414/146

[56] References Cited

U.S. PATENT DOCUMENTS

| | | |
|---|---|---|
| 4,202,727 | 5/1980 | Batjukov et al. ............... 414/146 X |
| 4,204,910 | 5/1980 | Koshkin et al. ................ 414/146 X |
| 4,236,967 | 12/1980 | Batjukov et al. .............. 414/146 X |
| 4,332,640 | 1/1982 | Chertock et al. ............... 414/146 X |
| 4,637,914 | 1/1987 | Boyle et al. ......................... 376/353 |

FOREIGN PATENT DOCUMENTS

| | | |
|---|---|---|
| 35911 | 9/1981 | European Pat. Off. ............ 376/260 |
| 2842756 | 4/1979 | Fed. Rep. of Germany ...... 376/260 |
| 1210962 | 3/1960 | France .................................. 376/260 |
| 204798 | 11/1984 | Japan ................................... 376/260 |

Primary Examiner—Mark Rosenbaum
Assistant Examiner—Frances Chin
Attorney, Agent, or Firm—Schwartz, Jeffery, Schwaab, Mack, Blumenthal & Evans

[57] ABSTRACT

This hooking device is fastened to the choke plug (8) for guide tube (2). It comprises of catches (54) regularly arrayed along the periphery of the flange (9) of the choke plug (8) and hooks to the upper spacer (4S) of the guide tube (2). It is kept in the engaged position by a spring system (56–58), (63–65) and can disengage by means of a tool means comprising a roller (77) acting on each catch (54) and a rim (68) resting on a muff (56) acting as a rest also for the spring (57).

27 Claims, 4 Drawing Sheets

HOOKING APPARATUS FOR A REMOVABLE CONSTRICTION PLUG

This application is a continuation, of application Ser. No. 746,262, filed June 19, 1985, now abandoned.

The control of the power of a nuclear power plant is implemented by varying the depth to which the control rods are inserted in the reactor core. To achieve this vertical displacement, each control rod is mounted at the end of a drive rod to form an assembly sliding within a guide-tube.

Each guide-tube is provided with spacer plates regularly arrayed over the entire height of the guide-tube and designed to maintain a constant spacing for the multiple rods forming the control rod and arranged in clusters.

The guide-tubes are hooked to a support plate covering the reactor core and through which the fluid exchanges are rigorously limited. To keep the fluid exchanges at acceptable values, the upper part of each guide-tube is provided with a choke or constriction plug through which slides the drive rod. These choke plugs must be detachable, using submersible tooling. Each choke plug is centered on the upper spacer plate of the guide-tube and comprises a peripheral collar to rest on it. It is kept in place by a hooking device comprising of a set of four flexible rods equidistant about the choke plug and arranged in such a manner that the top of each rod rests on the peripheral collar of the choke plug. This hooking device permanently mechanically stresses the flexible rods and may progressively degrade, due to the phenomenon of corrosion under stress, and thereby may also dangerously compromise the life of the choke plug.

The hooking device which is the object of this invention remedies these drawbacks and fits both the caliber of the guide tubes and that of the detaching tool. Depending on the height available in the upper part of the guide tube, the hooking device of the choke plug may assume several modes of embodiment.

In a first mode of embodiment, the hooking device comprises four catch springs in the form of very long needles.

Other embodiments include four hinging catches kept in the engaged position by a spring means.

The Figures below show details of each of these embodiments.

Figure 1:
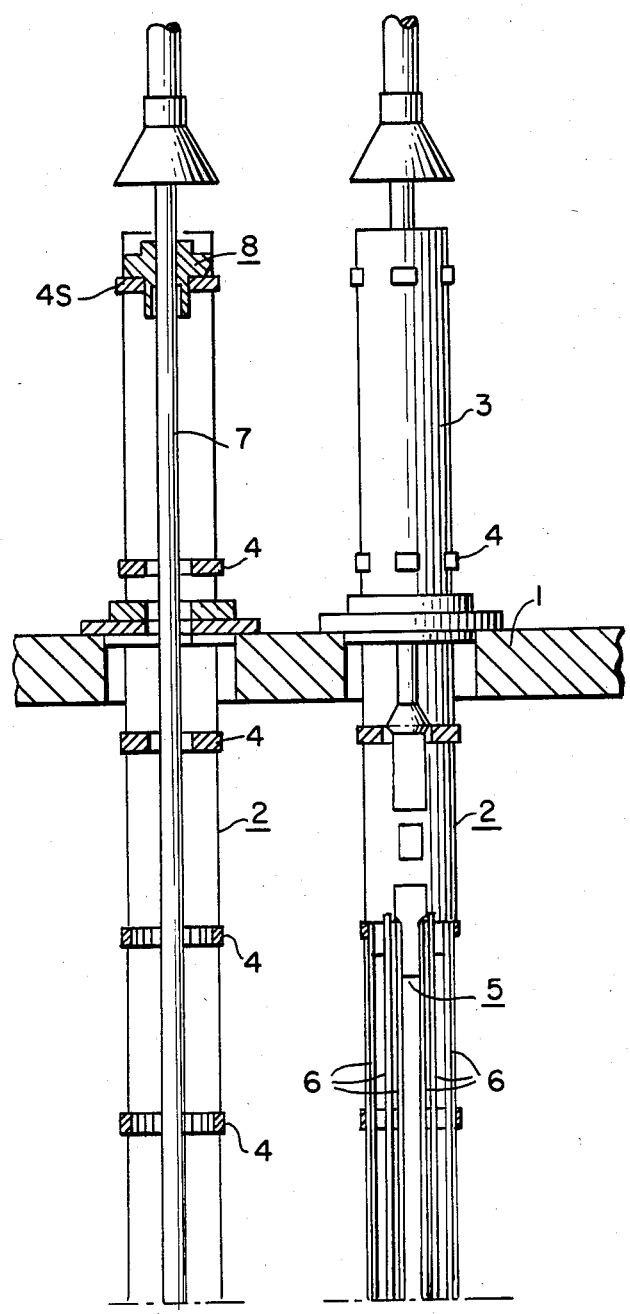
FIG. 1 is an assembly overview of the guide tube, of the control rod and of the drive rod.

FIG. 1 shows a plate support 1 onto which are fixed guide tubes 2. Each guide tube 2 comprises an upper part 3 above the plate support 1 and equidistant spacers 4 over the entire height of the guide tube 2. Within the guide tube 2, there slides a control rod 5 consisting of several rods 6 arranged in clusters and kept at a constant distance by a suitable configuration of the spacer plates 4. The control rod 5 is mounted on the end of a drive rod 7 to form an assembly which slides within the guide tube 2. To reduce the leakage rate, the spacer plate 4S is provided with a choke plug 8 which can be dismantled underwater by means of remote-controlled tooling.

Figure 2:
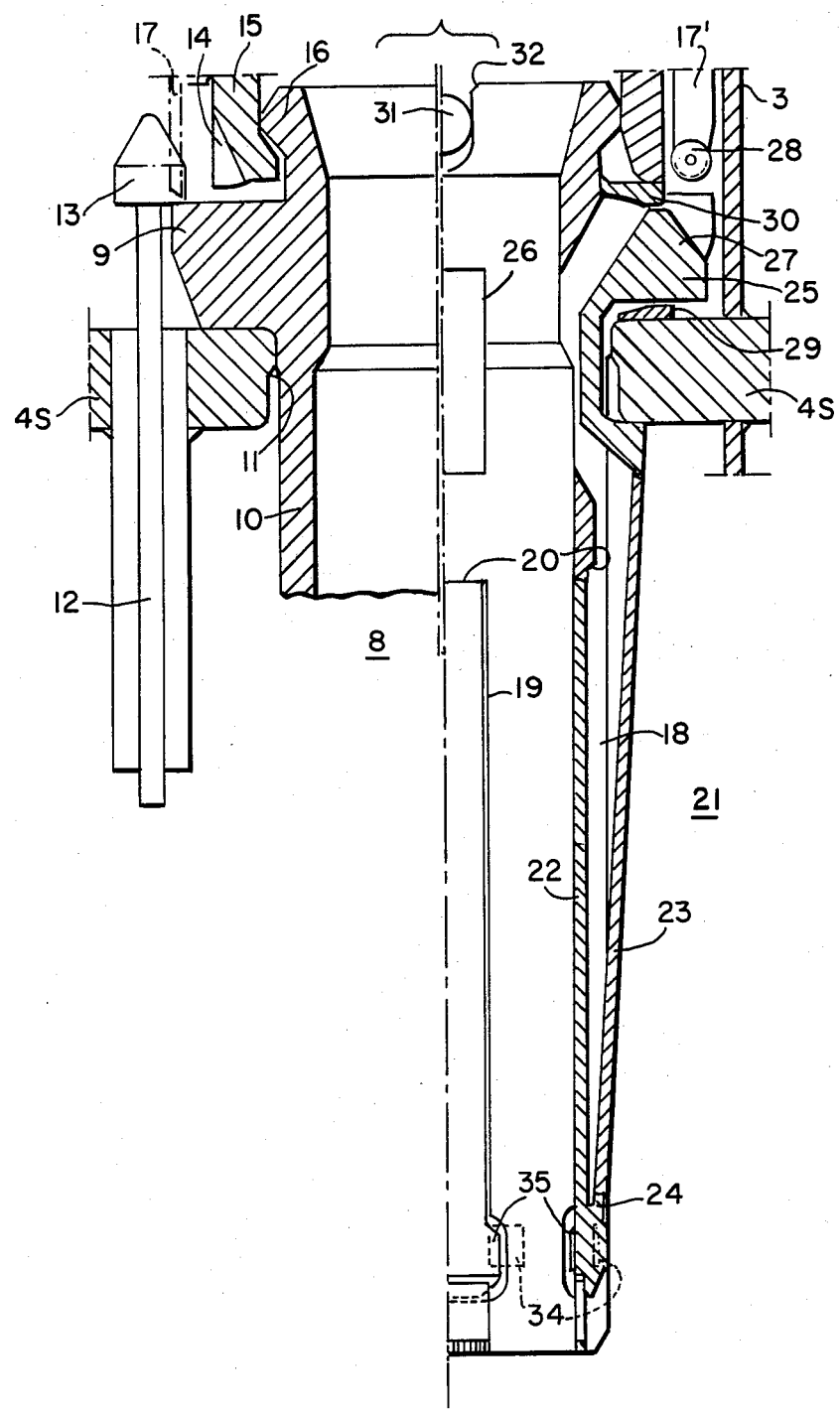
FIG. 2 is a hooking device formed of catch springs.

The left part of FIG. 2 shows the old hooking device whereas the right part shows a first embodiment mode. These two half-figures are not sections in a single plane but they represent sections in planes subtending between them an angle of 45°.

The choke plug 8 comprises a flange 9 resting on the upper spacer plate 4S and integral with a cylindrical part 10 which is inserted into a bore 11 of the upper spacer plate 4S.

The old hooking device for this choke plug 8 comprises four flexible rods 12 tipped by an end 13 with a larger diameter of which the lower surface, which is substantially horizontal, hooks to the upper surface of the flange 9, of which the upper surface is shaped to facilitate the work of the detaching/dismantling tool. Each of the rods 12 is solidly joined to the upper spacer plate 4S by a tube 14 of which the dimensions are adequate to impart to the rod 12 the required elasticity for hooking and unhooking the end 13 onto and from the flange 9. These flexible rods 12 are equidistant on the periphery of the flange 9 and are arranged in such a way that the end 13 partly covers the upper side of the flange 9.

To remove the choke plug 8, the tooling being used is provided with a cylinder 14 holding movable fingers 15 to hook onto the upper lip 16 integral with the flange 9. A muff 17 slides on the cylinder 14 and by its downward motion moves the end 13 out of the way to free the choke plug 8.

In the new hooking device, of the invention shown on the right in FIG. 2, the cylindrical part 10 of the choke plug 8 is extended by a collar 18 with a cutout in the form of a first window 19 in order to weld on its upper edge 20 the end of a catch spring 21 in the shape of a needle. This catch spring 21 comprises two arms 22 and 23 associated with each other by an angle piece 24. The shorter arm 22 is fastened to the upper edge 20 of the window 19 so as to be in an essentially vertical position whereas the longer arm 23 is shaped at its free end into a catch 25 gripping the upper spacer plate 4S from both sides.

A second window 26 allows the catch 25 to entirely clear off the upper spacer plate 4S during the detaching operation.

The catch 25 comprises a sloping side 27 allowing a roller 28 fastened joined to the muff 17' of the detaching tool to force back the catch 25 in order to free the choke plug 8. To reduce the leakage rate, each catch 25 engages between a first shim 29 fastened to the upper spacer 4S and a second shim 30 fastened to the flange 9. Thereby the leakage rate is practically reduced to merely the play between the diameter of the drive rod 7 and the diameter of the choke plug 8.

Because the catch 25 rests on the shim 29, the engaging force of the choke plug on the upper spacer 4S of the guide tube is considerably reinforced.

The new hooking device comprises four catch-springs 21 fastened to the choke plug 8 and equidistant on its periphery.

In order that the four rollers 28 of the detaching tool be opposite the sloping sides 27 of the four catches 25, an indexing pin 31 fixed to the detaching tool must enter a slot 32 in the upper lip 16 of the choke plug 8.

To limit the travel of each angle piece 24, a stop means 33 is fixed into the inside wall of the sleeve 18 and two other stops 34 (only one shown in FIG. 2), are fixed into the outer wall of the sleeve 18 to act as rests for two small fins 35 (only one shown in FIG. 2), which are laterally fastened to the angle piece 24.

Figure 3:
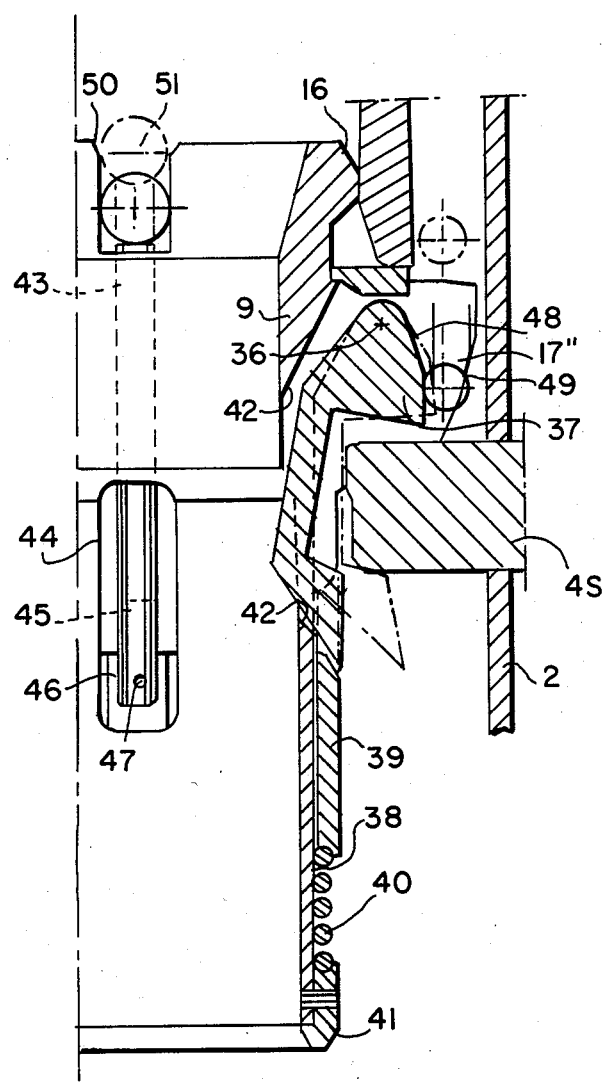
FIG. 3 is a hooking device formed of hinging catches pushed by a helical spring located at the lower part of the choke plug.

FIG. 3 shows another embodiment of the hooking device for the choke plug 8, which is used when the space available for the upper part 3 of the guide tube 2 (FIG. 1) is less than ample. In this different embodiment, the flange 9 is provided with four axes 36 regularly arranged on the same circumference and tangential to it so that one catch 37 each hinges about these axes 36 along a radial motion to grip the upper spacer plate 4S from either side. The axis 36 is located in the upper part of the catch 37 to permit it to assume the engaged position under its own weight.

In this embodiment, the cylindrical part 10 of the choke plug 8 is extended by a sleeve 38 on which slides a push muff 39 which is forced back upward by a helical spring 40 coaxial with the sleeve 38, resting on a stop 41 fastened to the lower end of the sleeve 38. The function of the push muff 39 is to keep the four hinging catches 37 in the engaged position.

Four windows 42 are cut out to allow the four hinging catches 37 to sufficiently move away from the upper spacer plate 4S to clear the choke plug 8.

Two rods 43 are parallel to the axis of the choke plug 8 and mutually diametrically opposite; they slide freely within the flange 9 and issue upward through the upper lip 16 and downward into two windows 44 (only one shown in FIG. 3) fashioned in the cylindrical part 10 and the sleeve 38 extending it.

Each of the rods 43 comprises a slot 45 at its lower part in order to be astride a thinned part 46 of the push muff 39. A rivet 47 passing from one end to the other from the lower part of the rod with the slot 45 to the thinned part 46 of the push muff 39 permanently connects each rod 43 and the push muff 39. These rods serve to force the push muff 39 downward to unlock the hinging catches 37.

Each hinging catch 37 has a sloping side 48 allowing a roller 49 fastened to the muff 17″ of the detaching tool to force back the hinging catch 37 in order to entirely free it from the upper spacer plate 4S.

To free the choke plug 8, the detaching tool first must unlock the hinging catches 37 before clearing them of the upper spacer plate 4S. To carry out these operations, two clearances 50 in the upper lip 16 at the precise locations where the two rods 43 issue allow two indexing pins 51 to enter them to move the four rollers 49 of the detaching tool opposite the sloping sides 48 of the hinging catches 37. When the indexing pins 51 enter the clearances 50 more deeply, they force downward the rods 43 and the push muff 39 to unlock the hinging catches 37.

When thereafter the muff 17″ bearing the rollers 49 slides downward, the four hinging catches are moved away to free the choke plug 8.

To reduce the leakage rate, a small plate 52 is fixed to the flange 9 opposite the four windows 42.

Figure 4:
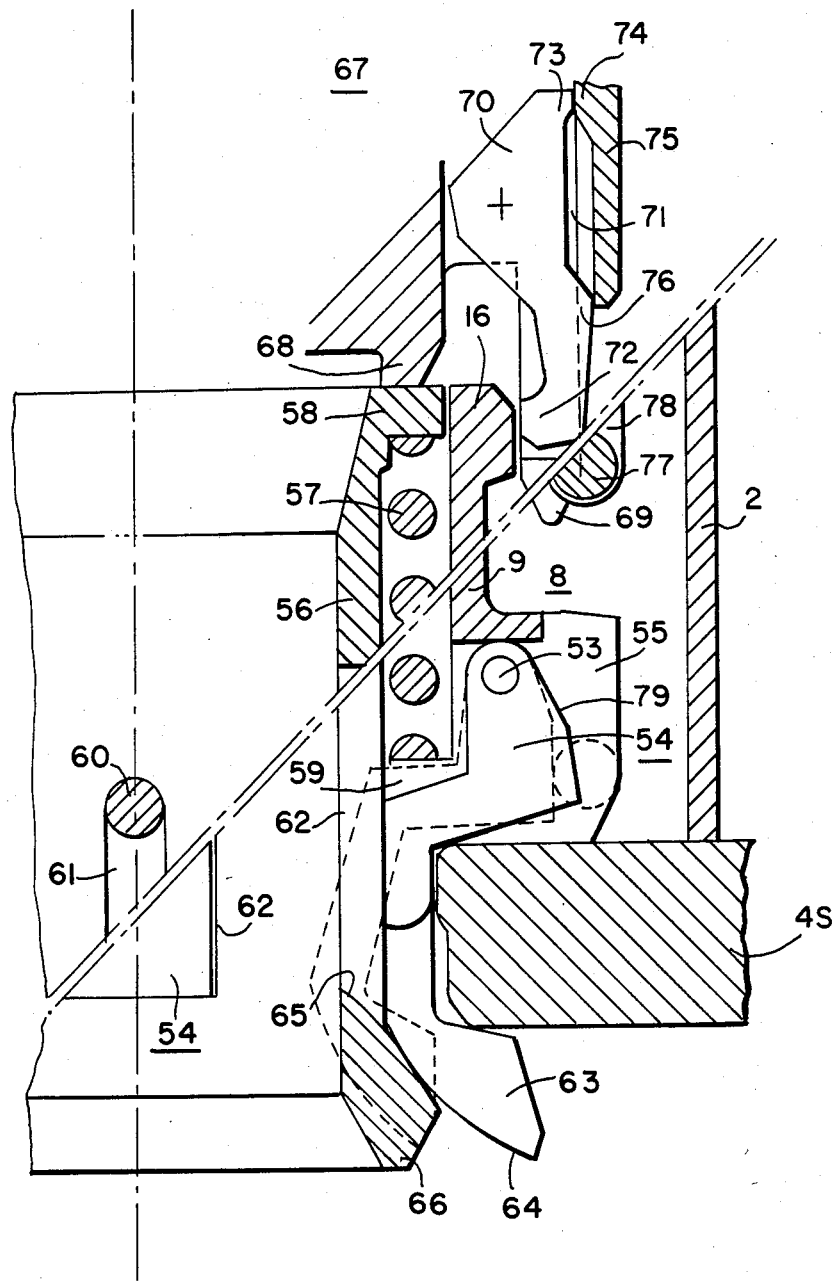
FIG. 4 is a hooking device formed of hinging catches pushed by a helical spring located at the upper part of the choke plug.

FIG. 4 shows an embodiment which is preferred because of its maximum compactness and because the compression spring is kept in a closed chamber to prevent any debris dispersion in case the spring breaks.

FIG. 4 shows two sections separated by a double axis line and shifted by 45° from each other.

The choke plug 8 comprises a flange 9 provided with four axes 53 tangent to the same circumference and offset by 90° from one another. A catch 54 hinges on each axis 53 to grip the upper spacer plate 4S. The axis 53 is located at the upper part of the catch 54 to allow it to assume the engaged position under its own weight. The flange 9 comprises one cut-out window 55 for each catch 53 to allow the free displacement of the catch 54. In this embodiment, a muff 56 slides inside the flange 9 and comprises in its central part a smaller outside diameter to house a helical spring 57 resting on one hand against an upper shoulder 58 of the muff 56 and on the other hand on a lower shoulder 59 of the lower part of the flange 9. The travel of the helical spring 57 is limited and the proper orientation of the muff 56 with respect to the flange 9 is assured by two diametrically opposed pins 60 which are fixed to the flange 9 that moves each in a vertical slot 61 of the muff 56. The muff 56 also comprises a window 62 opposite each window 55 of the flange 9 to allow complete retraction of the catch 54. The catch 54 is hook-shaped and has a curved surface 64 on the back of its end 63 to collaborate with another curved surface 65 of the lower part 66 of the muff 56 in order to keep the catch 54 in the engaged position when, under the action of the spring 57, the upper shoulder 58 of the muff 56 and the lower shoulder of the flange 9 are moved apart from each other a maximum distance. On the other hand the end 63 of the catch 54 hooks onto the upper spacer plate 4S at such an angle that there is self-locking of the catch 54 to the upper spacer plate 4S even if the spring 57 were to break.

To remove or put into place the choke plug 8, the catch 54 must be placed into the disengaged position. A tool means 67 is provided for that purpose and comprises at its lower part a rim 68 resting on the upper shoulder 58 of the muff 56 in such a way that the spring 57 is compressed. The tool 67 also comprises a second rim, called the centering rim 69, which is concentric with the first rim 68 but has a larger diameter and is located forward to act as a guide means for the for the tool 67. This centering rim 69 bears movable fingers 70 which can freely move radially into windows 71 in the centering rim 69. Each movable finger 70 has its end 72 shaped to hook up to the upper collar 16 of the choke plug 8. The disengaged position of the movable finger is obtained by the cooperation of a boss 73 located at the upper outer part of the movable finger 70 with a boss 74 located on the inside part of a slide-means 75 moving on the periphery of the tool 67.

FIG. 4 shows the tool 67 at the time the lower rim 68 is making contact with the upper shoulder 58 of the muff 56. When the tool 67 is descending, it forces the muff 56 downward and compresses the spring 57. The moment the end 72 of the movable finger 70 has passed the upper collar 16, the slide-means 75 may slide downward with respect to the tool 67 so that the boss 74 shall make contact with a boss 76 located in the outer median part of the movable finger 70 in order to force this finger back toward the center and to grip the choke plug 8 by its upper collar 16.

Simultaneously, a roller 77 counted to the end of an unlocking finger 78 makes contact with a sloping side 79 of the catch 54 to progressively force back this catch toward the center to disengage it from the upper spacer plate 4S. This movement is made possible by the separation of the curved surfaces 64 and 65 respectively belonging to the end of the catch 54 and the lower end of the muff 56 as a consequence of the downward push by the tool 67 on the muff 56.

The disengaged position of the catch 54 is shown in dotted lines in FIG. 4. This position is assumed when the rim 68 of the tool 67 has compressed the spring 57 and has disengaged the end 63 of the catch 54 from the lower part of the muff 56 and when the roller 77 has pushed back the catch 54 toward the inside to completely disengage it from the upper spacer plate 4S. At that moment the end 72 of the movable finger 70 is engaged in the upper collar 16 of the choke plug 8 which then can be removed.

I claim:

1. A hooking device for a removable choke plug positioned in a guide tube having a plurality of spacer plates, comprising:
   (a) a plurality of catch element means distributed around the periphery of the choke plug for gripping one of the spacer plates,
   (b) the catch element means being fastened to the choke plug, and
   (c) means for locking the catch element means in an engaged position.

2. The hooking device as in claim 1, including:
   (a) a detaching tool,
   (b) a roller fastened to the detaching tool,
   (c) an inclined surface on the catch element means whereby the roller moves parallel to the axis of the guide tube for disengaging the catch element means from the one spacer plate.

3. A hooking device as in claim 2, wherein the means for locking comprises:
   (a) a sleeve fixed substantially coaxially to a lower part of the choke plug,
   (b) a push muff adjacent to the sleeve,
   (c) a shoulder stop fastened to the sleeve, and
   (d) a helical spring supported by the shoulder stop whereby the helical spring opposes the push muff which slides on the sleeve for locking the catch element means in the engaged position.

4. A hooking device according to claim 3, including sliding rods for repelling the push muff toward the lower part of the choke plug for unlocking the catch element means.

5. A hooking device as in claim 4 including:
   (a) at least one indexing pin, and
   (b) an upper face of the choke plug having a notch for engaging the at least one indexing pin whereby the roller is positioned with respect to the inclined surface of the catch element means for repelling the sliding rods.

6. A hooking device as in claim 1, wherein the catch element means comprises a catch articulated about an axis disposed tangentially to a concentric circumference about the axis of the guide tube, and wherein the locking means comprises:
   (a) a sleeve having an upper shoulder, and
   (b) a helical spring supported on one end against the upper shoulder of the sleeve and on the other end against a lower shoulder of an internal portion of the choke plug for maintaining the catch in the engaged position by the cooperation of a lower part of the sleeve and an extremity of the catch.

7. The hooking device as in claim 6, wherein the sleeve has a curved surface at a lower end of the sleeve and wherein the extremity of the catch has a curved surface at a back of the extremity whereby the curved surface of the sleeve cooperate with the curved surface at the back of the extremity for hooking the catch to the one space plate at such an angle that there is self-locking of the catch to the one spacer plate.

8. A hooking device as in claim 6 including pins engaged in slots in the sleeve for orienting the sleeve with respect to the choke plug and for limiting the sliding of the sleeve on the interior of the choke plug.

9. A hooking device for a choke plug for a guide tube comprising:
   catch elements regularly distributed around the periphery of the choke plug in order to engage an upper spacer plate, the catch elements being fastened to the choke plug and being kept in the engaged position under the action of a spring means,
   each catch element having an inclined surface allowing a roller solidly on a detaching tool to move parallel to the axis of the guide tube to disengage the catch element from the upper spacer plate.

10. A hooking device for a choke plug for a guide tube comprising:
    catch elements regularly distributed around the periphery of the choke plug in order to engage an upper spacer plate, the catch elements being fastened to the choke plug and being kept in the engaged position under the action of a spring means; and
    wherein the spring means comprises a very long spring fastened at one end to the catch element and on the other end to the choke plug.

11. A hooking device as in claim 10, wherein the very long spring is formed of two arms of unequal lengths and fastened to each other by an angle piece of which the excursion is limited by stops which are fastened to the choke plug.

12. A hooking device for a choke plug for a guide tube comprising:
    catch elements regularly distributed around the periphery of the choke plug in order to engage an upper spacer plate, the catch elements being fastened to the choke plug and being kept in the engaged position under the actions of a spring means, and
    wherein the catch element comprises a catch swinging about an axis located at the upper part of the catch to allow it to assume an indexed position under its own weight and wherein the spring means comprises a helical spring which, resting on a stop that is fastened to a sleeve and is fixed in place coaxially with the lower part of the choke plug, pushes back a push muff which by sliding on the sleeve keeps the catch in the engaged position.

13. A hooking device as in claim 12, including sliding rods to force the push muff downward to unlock the catches.

14. A hooking device as in claim 12, wherein each catch element has an inclined surface allowing a roller on a detaching tool to move parallel to the axis of the guide tube to disengage the catch element from the upper spacer plate, and
    wherein the upper side of the choke plug has a notch which is engaged by one or more indexing pins to suitably position the rollers with respect to the inclined surface of the catch elements and to force back the sliding rods.

15. A hooking device for a choke plug for a guide tube comprising:
    catch elements regularly distributed around the periphery of the choke plug in order to engage an upper spacer plate, the catch elements being fastened to the choke plug and being kept in the engaged position under the action of a spring means,
    wherein each catch element comprises a catch hinged about an axis tangential to a circumference concentric with the axis of the guide tube and located at the upper part of the catch so it may assume an engaged position under its own weight, and wherein the spring means comprises a helical spring resting on one end against an upper shoulder of a muff sliding inside the choke plug and on the other end on a lower shoulder of the inside part of the choke plug, wherein the spring means keeps the catch in its engaged positioned by the cooperation between a lower part of the muff and an end of the catch.

16. A hooking device as in claim 15, wherein the lower part of the muff has a curved surface cooperating with another curved surface fashioned in the end of the catch which hooks to the upper spacer plate at such an angle that there is self-locking of the catch to the upper spacer plate.

17. A hooking device as in claim 15, in that the muff sliding within the choke plug is limited in its travel and is oriented with respect to the choke plug by means of pins cooperating with slots in the muff.

18. A hooking device for a choke plug for a guide tube comprising:
catch elements regularly distributed around the periphery of the choke plug in order to engage a flange solidly joined to he choke plug and resting on an upper spacer plate,
each catch element fastened to the choke plug being engaged in the engaged position under the action of its own weight and being locked in the engaged position with the aid of locking means.

19. The hooking device of claim 18, wherein each catch element has an inclined surface allowing a roller on a detaching tool to move parallel to the axis of the guide tuber to disengage the catch element from the upper spacer plate.

20. The hooking device of claim 18, including a very long spring fastened with one end to the catch element and on another end to the choke plug.

21. The hooking device of claim 20, wherein the very long spring is formed of two arms of unequal lengths and being solidly joined to each other by an angle piece the movement of which is limited by stops which are fastened to the choke plug.

22. The hooking device of claim 18, wherein the catch element comprises a catch swinging about an axis located at the upper part of the catch to allow it to assume an indexed position under its own weight and wherein a spring means comprises a helical spring which, resting on a stop that is fastened to a sleeve and is fixed in place coaxially with the lower part of the choke plug, pushes back a push muff which by sliding on the sleeve keeps the catch in the engaged position.

23. The hooking device of claim 18, wherein each catch element comprises a catch hinged about an axis tangential to a circumference concentric with the axis of the guide tube and located at the upper part of the catch so it may assume an engaged position under its own weight, and
a helical spring resting on one end against an upper shoulder of a muff sliding inside the choke plug and on the another end on a lower shoulder of the inside part ofthe choke plug, wherein the spring means keeps the catch in its engaged position by the cooperation between a lower part of the muff and an end of the catch.

24. The hooking device of claim 18, wherein under the action of a detaching tool, a plurality of sliding rods force a push muff downward to unlock the catch elements.

25. The hooking device of claim 24 wherein each catch element has an inclined surface allowing a roller on a detaching tool to move parallel to the axis of the guide tube to disengage the catch element from the upper spacer plate, and
wherein the upper side of the choke plug has a notch which is engaged by one or more indexing pins to suitably position the rollers with respect to the inclined surface of the catch elements and to force back the sliding rods.

26. The hooking device of claim 23 wherein the lower part of the muff has a curved surface cooperating with another curved surface fashioned in the end of the catch which hooks to the upper spacer plate at such an angle that there is self-locking of the catch to the upper spacer plate.

27. The hooking device of claim 23 wherein the muff sliding within the choke plug is limited in its travel and is oriented with respect to the choke plug by means of pins cooperating with slots in the muff.

* * * * *